United States Patent
Tanizawa et al.

(10) Patent No.: US 8,252,733 B2
(45) Date of Patent: Aug. 28, 2012

(54) SLIDING MATERIAL AND SLIDING MEMBER USING THE SLIDING MATERIAL

(75) Inventors: Motoharu Tanizawa, Kariya (JP); Kyoichi Kinoshita, Kariya (JP); Motoji Miyamoto, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 698 days.

(21) Appl. No.: 12/226,124

(22) PCT Filed: Mar. 27, 2007

(86) PCT No.: PCT/JP2007/057365
§ 371 (c)(1),
(2), (4) Date: Jul. 31, 2009

(87) PCT Pub. No.: WO2007/116852
PCT Pub. Date: Oct. 18, 2007

(65) Prior Publication Data
US 2009/0305917 A1 Dec. 10, 2009

(30) Foreign Application Priority Data

Apr. 12, 2006 (JP) .................................. 2006-109699
Apr. 12, 2006 (JP) .................................. 2006-109707

(51) Int. Cl.
*C10M 103/04* (2006.01)
*B05D 3/12* (2006.01)
(52) U.S. Cl. ........ 508/103; 427/190; 427/191; 427/192; 427/327; 427/328
(58) Field of Classification Search .................. 508/100, 508/103, 108; 427/180, 189, 190, 191, 192, 427/198, 199, 327, 328, 422, 446, 448, 455, 427/456
See application file for complete search history.

(56) References Cited

U.S. PATENT DOCUMENTS
2005/0153156 A1 * 7/2005 Miyoshi et al. ............... 428/613
(Continued)

FOREIGN PATENT DOCUMENTS
JP 59-150085 8/1984
(Continued)

OTHER PUBLICATIONS

Notification of Reasons for Refusal (with translation) of corresponding JP Application No. 2006-109707, dated Jul. 6, 2011.
(Continued)

*Primary Examiner* — Ellen McAvoy
*Assistant Examiner* — Taiwo Oladapo
(74) *Attorney, Agent, or Firm* — Locke Lord LLP

(57) ABSTRACT

To provide a sliding material whose superficial sliding characteristics can be modified in compliance with the requirements of sliding component parts without ever changing the surface roughness of sliding material very much by means of shot blasting treatment, and to provide a sliding member using the sliding material.

A sliding material according to the present invention is characterized in that it comprises: a metallic substrate; and an adhered metal being formed by mechanical adhesion by means of shot blasting metallic particles, which are softer than said metallic substrate and whose friction coefficients are smaller than that of said metallic substrate, onto a sliding surface of said metallic substrate so as to cover 8% or more of the sliding surface of said metallic substrate.

7 Claims, 4 Drawing Sheets

U.S. PATENT DOCUMENTS

2006/0275543 A1 * 12/2006 Miyasaka .................... 427/180

FOREIGN PATENT DOCUMENTS

| JP | 63-001383 B2 | | 1/1988 |
|---|---|---|---|
| JP | 06-279959 | | 10/1994 |
| JP | 08-253852 | | 10/1996 |
| JP | 08253852 A | * | 10/1996 |
| JP | 09-189359 A | | 7/1997 |
| JP | 09-268319 | | 10/1997 |
| JP | 11-131257 A | | 5/1999 |
| JP | 11-207622 | | 8/1999 |
| JP | 2001-158974 | | 6/2001 |
| JP | 2002-283037 A | | 10/2002 |
| JP | 2003-013163 | | 1/2003 |
| JP | 2003-328056 A | | 11/2003 |
| JP | 2004-002912 | | 1/2004 |
| JP | 2004002912 A | * | 1/2004 |
| JP | 2005-040893 A | | 2/2005 |
| JP | 2005-163145 | | 6/2005 |

OTHER PUBLICATIONS

Notification of Reasons for Refusal (with translation) of corresponding JP Application No. 2006-109699, dated Jan. 20, 2011.

International Search Report from International Application No. PCT/JP2007/057365, dated May 29, 2007.

Notification of Reasons for Refusal of corresponding JP Application No. 2006-109699, dated Nov. 11, 2010.

English translation of the International Preliminary Report on Patentability dated Nov. 17, 2008, Application No. PCT/JP2007/057365.

* cited by examiner

| No. | ID No. | Rz (μm) | Shotting Conditions ||||
|---|---|---|---|---|---|---|
| | | | Shot Particles' Quality of Material | Air Pressure (MPa) | Jet Distance (mm) | Projection Time (sec.) |
| 1 | 0 | 0.7 | – | – | – | – |
| 2 | 1 | 6.9 | Alumina (AF30) | 0.3 | 100 | 5 |
| 3 | 2 | 9.8 | Iron (SB-3) | 0.3 | 100 | 5 |
| 4 | 2-1 | 9.4 | Iron (SB-3) | 0.1 | 100 | 5 |
| 5 | 2-2 | 8.8 | Iron (SB-3) | 0.1 | 150 | 5 |
| 6 | 3 | 2.2 | Zinc (AD-4) | 0.3 | 100 | 5 |
| 7 | 2-3 | 2.2 | Zinc (AD-4) | 0.1 | 100 | 20 |
| 8 | 2-4 | 4.6 | Zinc (AD-4) | 0.1 | 100 | 30 |

Large irregularities existed abundantly as a whole.

Fine irregularities were less.

Fine irregularities existed abundantly.

SLIDING MATERIAL AND SLIDING MEMBER USING THE SLIDING MATERIAL

RELATED APPLICATION

This application is a national stage entry of PCT/JP2007/057365, filed Mar. 27, 2007 which claims foreign priority from Japanese Patent Application No. 2006-109699, filed Apr. 12, 2006, and Japanese Patent Application No. 2006-109707, filed Apr. 12, 2006 which are incorporated by reference in their entirety.

FIELD OF THE INVENTION

The present invention relates to a sliding material, and a sliding member comprising a predetermined configuration which uses the sliding material, sliding material and sliding member that can be utilized in engine blocks a part of whose surface makes a sliding surface, hydraulic pumps, component parts for compressors, bearings, and the like.

BACKGROUND OF THE INVENTION

For a variety of machines that carry out reciprocal, rotary movements, and the like, sliding members are indispensable generally. For example, various sliding members have been utilized in engines, compressors, and so forth, as well.

In general, in sliding surfaces, it is desirable that the sliding surfaces can turn into a mirror surface in order to decrease the wear amount by friction. However, when a sliding surface turns into a mirror surface, although the friction resistance between metals, which are subjected to a mirror-surface finishing, can be suppressed when they are rubbed to each other by way of oil, there might be a fear of seizure because a certain amount of heat generates. Accordingly, for sliding surfaces, in order to meet their respective applications, those with appropriate surface roughness being provided, and those whose superficial sliding characteristics are modified by performing a surface treatment, such as plating, onto the sliding surface have been required.

Moreover, it has been carried out generally to supply an adequate lubricating agent between sliding surfaces, thereby diminishing the frictional force and wear or superficial damages of other forms. In order to secure a sufficient oil-film thickness, it is needed to retain the lubricating agent in an adequate amount on the sliding surfaces. In order to secure the lubricating agent in an adequate amount, such a technique has been carried out since long time ago that "X"-shaped streaklike marks, so-called cross-hatchings, for instance, are made in sliding surfaces so as to retain the lubricating agent within the streaklike marks.

An iron-based sliding material is set forth in Patent Literature No. 1, iron-based sliding material which comprises 5-50% by weight TiCN and the balance of an iron-based alloy; whose porosity is adapted into being 7-20% by volume in a superficial portion from a surface of the sliding surface to a depth of 1 mm; and whose internal porosity is decreased less than this. The fact that, when the iron-based sliding member set forth in Patent Literature No. 1 is used under such a condition that a lubricating oil exists, the frictional wear can be improved considerably is disclosed therein, because the pores in the superficial portion are impregnated with the lubricating oil.

An iron-based sintered alloy is set forth in Patent Literature No. 2, iron-based sintered alloy which comprises: a dispersion phase of at least one or more members of oxides, carbides and sulfides of Ca, Sr and Ba, and mutual solid solutions of these, or carbon, in a sintered alloy; a hard phase of at least one member of carbides and nitrides of metals of groups 4a, 5a and 6a in the periodic table, and mutual solid solutions of these; and the balance of a binder phase comprising an alloy that includes ferrite, austenite, martensite or Fe as a major component; in which the dispersion phase is removed from a superficial portion of the iron-based sintered alloy so that fine pores are formed. The following is disclosed: in the iron-based sintered alloy set forth in Patent Literature No. 2, it is possible to impregnate the inside of the fine pores that are formed in the superficial portion with a lubricating substance, thereby lowering the friction coefficient.

In Patent Literature No. 3, performing a shot peening treatment onto a sliding surface of sliding member (quality of material: carbon steel, chromium steel, or chromium-molybdenum steel) using shots with 0.6-1.0 mm particle diameters is disclosed, thereby changing a superficial form of the sliding surface so as to reduce the friction coefficient at an initial stage of sliding (so as to turn the leading end of after-shotting superficial configuration into a rounded convex configuration). The following is also disclosed: it is possible to suppress the frictional heat generation by means of reducing the friction coefficient at an initial stage of sliding, and thereby it is possible to suppress the deterioration of lubricating grease.

Moreover, a few methods of modifying surfaces by means of shot blasting have been studied depending on their objectives, because it is possible to carry out processing even after sliding materials are formed into sliding members, and because it is possible to give them residual stresses by means of compression.

For example, in Patent Literature No. 4, there is disclosed, in order to control the wear of mating material in sliding, a method of removing edges, which arise from burrs and the like in polished surfaces, (rounding them, scraping them off, or cutting off the leading-end portions) by means of performing a shot jetting treatment onto a polished surface of mechanical component part in which hard particles, such as metallic carbide, are dispersed in large amount, polished surface to which a surface polishing treatment has been carried out. The following is also disclosed: it is possible to effectively suppress the wear of mating member upon sliding by means of removing the edges.

Moreover, in Patent Literature No. 5, there is disclosed a sliding member that is made from a powdery aluminum alloy, sliding member which is made from a powdery aluminum alloy in which iron-based hard particles and hard particles, that is, one member or more of ceramic particles whose hardness is lower than that of alumina, are dispersed, and powdery aluminum alloy which includes silicon, manganese and magnesium; sliding member in which a large number of concaved portions are formed in a sliding surface of the sliding member by means of shot blasting using fine particles with one of nickel and tin being coated; and additionally sliding member on which one of nickel coating and tin coating is formed. The following are also disclosed: the large number of concaved portions fulfill a role of oil reservoirs, thereby it is possible to secure an oil-retaining function for the sliding surface; and moreover nickel or tin coating is made on a surface of aluminum alloy that is likely to undergo agglomeration, and thereby it becomes less likely to wear so that it is possible to improve the scuff preventiveness; and the sliding surface undergoes work hardening by means of hitting the fine particles onto the sliding surface so that the wear resistance improves to that extent.

Patent Literature No. 1: Japanese Examined Patent Publication (KOKOKU) Gazette No. 63-1,383;

Patent Literature No. 2: Japanese Unexamined Patent Publication (KOKAI) Gazette No. 6-279,959;
Patent Literature No. 3: Japanese Unexamined Patent Publication (KOKAI) Gazette No. 9-268,319;
Patent Literature No. 4: Japanese Unexamined Patent Publication (KOKAI) Gazette No. 11-207,622; and
Patent Literature No. 5: Japanese Unexamined Patent Publication (KOKAI) Gazette No. 2003-13,163

SUMMARY OF THE INVENTION

Assignment to be Solved by the Invention

However, it has been well known that, in the aforementioned method of making streaklike marks on sliding surfaces, the streaklike marks wear away gradually in service and thereby the retention force for lubricating agent has come to decline. Moreover, in the case of aforementioned Patent Literature No. 1, since it is difficult to control the amount and size of the pores by press molding or at the sintering step, there have been such manufacturing-control and quality-control problems that the sizes and porosity of obtainable pores have fluctuated greatly. In addition, in the case of aforementioned Patent Literature No. 2, it is directed to using an alloy that includes such a special substance as aforementioned. Moreover, aforementioned Patent Literature No. 3 is directed to those to which the shot peening treatment is performed in order to suppress the frictional heat generation and in order to suppress the deterioration of lubricating grease, but it is not for the purpose of the retention of lubricating agent.

Moreover, the characteristics that are required for sliding surfaces change variously depending on what sliding component parts they are intended for. Although the method of modifying surfaces by means of shot blasting has been studied, as indicated in the aforementioned patent publication, in compliance with their objectives, sliding materials whose sliding characteristics can be modified so as to meet the requirements of sliding component parts have been desired.

Moreover, in many of sliding component parts, the surface roughness has been prescribed in order to reduce the wear amount when it slides. For example, since the surface roughness (Rz) that is required for the bores in engine has been determined, it is required to upgrade sliding characteristics within the surface roughness.

The shot jetting treatment in aforementioned Patent Publication No. 4 is used for removing burrs, and decreases the wear amount by means of changing the Sm value (an averaged interval between crests) without changing the surface roughness (Rz) very much. Moreover, in Patent Literature No. 5, the surface roughness is increased fivefold by means of carrying out the shot blasting treatment.

The present invention is one which has been done in view of such circumstances, and aims at providing a sliding material, whose superficial sliding characteristics can be modified in compliance with the requirements of sliding component parts without ever changing the surface roughness of sliding material very much by means of shot blasting treatment, and aims at providing a sliding member using the sliding material.

Further, the present invention aims at providing a sliding member which comprises fine pores in the sliding surface, and in which the fine pores form oil reservoirs and thereby the friction coefficient in the sliding surface can be reduced effectively.

Means for Solving the Assignment

Hence, in order to solve these assignments, the present inventors had been investigating wholeheartedly and had been repeating trials and errors over and over again; as a result, they discovered the fact that it is possible to modify the sliding characteristics of sliding surfaces, without ever making the surface roughness greater very much, by means of forming a part of metallic particles on a sliding surface of a metallic substrate by mechanical adhesion by means of shot blasting metallic particles, which are softer than said metallic substrate and whose friction coefficients are smaller than that of the metallic substrate, onto a sliding surface of the metallic substrate; and they arrived at completing the present invention.

Specifically, a sliding material according to the present invention is characterized in that it comprises:
a metallic substrate; and
an adhered metal being formed by mechanical adhesion by means of shot blasting metallic particles, which are softer than said metallic substrate and whose friction coefficients are smaller than that of said metallic substrate, onto a sliding surface of said metallic substrate so as to cover 8% or more of the sliding surface of said metallic substrate.

Moreover, it is preferable that said metallic substrate can be either one of iron, iron-based alloys, iron-based porous materials, or composite materials in which an iron-based porous material is cast-wrapped in aluminum, an aluminum alloy, magnesium or a magnesium alloy, but in which said iron-based porous material is exposed in a sliding surface thereof; said metallic particles can include at least one member being selected from the group consisting of zinc, tin, gold, copper and magnesium.

Moreover, it is preferable that said metallic substrate can be a composite material in which a first porous metallic material is cast-wrapped in a second metallic substrate being softer than the first porous metallic substrate, but in which the first porous metallic substrate is exposed in a sliding surface thereof; said metallic particles can be softer than the first porous metallic substrate, and can be harder than the second metallic substrate; and said adhered metal can be formed by mechanical adhesion by means of shot blasting said metallic particles onto a sliding surface of said first porous metallic substrate.

In particular, it is preferable that said first porous metallic substrate can be an iron-based porous material; said second metallic substrate can be an aluminum alloy; said metallic particles can be zinc; and said adhered metal can be formed on a surface of said iron-based porous material in said sliding surface by mechanical adhesion.

Moreover, it is preferable that, in said sliding surface of said second metallic substrate, dented portions can be formed by means of shot blasting said metallic particles.

Moreover, it is allowable that the processing conditions of said shot blasting can be the following conditions:
Particle Diameters of the Metallic Particles: from 150 μm or more to 800 μm or less;
Air Pressure: from 0.1 MPa or more to 0.3 MPa or less;
Jet Distance: from 50 mm or more to 150 mm or less; and
Projection Time: from 5 seconds or more to 45 seconds or less.

Moreover, a sliding member according to the present invention is characterized in that it comprises a predetermined configuration, which uses the aforementioned sliding material.

In particular, it is preferable that said sliding member can be a cylinder bore.

Effect of the Invention

Owing to shot blasting the metallic particles, which are softer than said metallic substrate and whose friction coefficients are smaller than that of the metallic substrate, onto a sliding surface of the metallic substrate, a part of said metallic particles are alloyed mechanically with said metallic substrate (mechanical alloying), and are thereby adhered thereon mechanically. Since said metallic particles are softer than said metallic substrate, they do not roughen a surface of said metallic substrate at all.

Moreover, by means of the fact that said adhered metal covers 8% or more of a sliding surface of said substrate at least, the characteristics of the adhered metallic particles appear as superficial characteristics, and thereby the sliding surface's sliding characteristics are modified. In addition, it is possible to reduce the sliding surface's friction coefficient by means of mechanically adhering the metallic particles whose friction coefficients are smaller than that of said metallic substrate.

Moreover, by means of being either one of iron, iron-based alloys, iron-based porous materials, and composite materials in which an iron-based porous material is cast-wrapped in aluminum, an aluminum alloy, magnesium or a magnesium alloy, said metallic substrate is of light weight and exhibits excellent strength.

Moreover, by means of the fact that said metallic particles include at least one member being selected from the group consisting of zinc, tin, gold, copper and magnesium, the sliding surface's sliding characteristics are improved by means of the characteristics that the respective metals, which are softer than the substrate, possess.

Moreover, it is allowable that said metallic substrate can be a composite material in which a first porous metallic material is cast-wrapped in a second metallic substrate being softer than the first porous metallic substrate, but in which the first porous metallic substrate is exposed in a sliding surface thereof. By means of adapting the metallic substrate into a composite material of a first porous metal and a second metal, it turns into a sliding member that possesses the advantages of both metals.

Moreover, owing to the fact that said metallic particles are softer than said first porous metallic substrate, and owing to the fact that they are harder than said second metallic substrate, said metallic particles can form dented portions in a sliding surface of said second metallic substrate when shot blasting said metallic particles, and they are formed on a sliding surface of said first porous metallic substrate by mechanical adhesion. Said dented portions' quantity, opening diameters, and the like, can be controlled by means of controlling the conditions of shot blasting treatment. Accordingly, in the case of utilizing a lubricating agent or the like, the dented portions can turn into oil reservoirs for the lubricating agent or the like. Comprising the dented portions makes it possible to retain a lubricating agent or the like in an adequate amount when utilizing the lubricating agent or the like, and makes it possible to possess a low friction coefficient, without ever damaging a sliding surface as a whole.

Accordingly, the sliding surface of said metallic substrate that is a composite material is modified along with the sliding surfaces of both metallic substrates so that the sliding characteristics can be upgraded.

In particular, it is preferable that said first porous metallic substrate can be an iron-based porous material; said second metallic substrate can be an aluminum alloy; and said metallic particles can be zinc. The metallic substrate, in which an iron-based porous material is cast-wrapped in an aluminum alloy and said first porous metallic substrate is exposed in a sliding surface thereof, is lighter than iron-based material, and moreover is excellent as a sliding material because the strength is higher than that of simple aluminum alloy per se.

In addition, since the iron-based porous material is porous, it is possible to secure the adhesiveness to aluminum alloy.

Moreover, by means of adapting the metallic particles into zinc that is softer than iron but is harder than aluminum alloy, although dented portions can be made in the aluminum alloy's surface by means of shot blasting zinc, it does not make the surface roughness (Rz) of sliding material's sliding surface greater very much because no damages are made in the iron-based porous material's surface. And, said dented portions' quantity, opening diameters, and the like, can be controlled by means of controlling the conditions of shot blasting treatment. Accordingly, in the case of utilizing a lubricating agent or the like, the dented portions can turn into oil reservoirs for the lubricating agent or the like. Therefore, comprising the dented portions in the sliding surface's aluminum-alloy section alone makes it possible to retain a lubricating agent or the like in an adequate amount when utilizing the lubricating agent or the like, and consequently makes it possible to possess a low friction coefficient, without ever damaging a sliding surface as a whole.

Moreover, zinc that is softer than the iron-based porous material adheres mechanically on the iron-based porous material's surface. Since zinc exhibits a small friction coefficient compared with that of the iron-based porous material, it is possible to lower the friction coefficient of the iron-based porous material's surface by means of adhering zinc thereon, and eventually it is possible to lower the friction coefficient of the entire sliding surface and to reduce time until seizure. Therefore, it is possible to adjust its superficial characteristics by means of adjusting the proportion of the iron-based porous material and that of the aluminum alloy.

Moreover, it is possible to mechanically adhere the metallic particles on the metallic substrate adequately by means of the fact that the processing conditions of said shot blasting are the aforementioned conditions.

Moreover, the sliding member according to the present invention can possess favorable sliding characteristics by means of using the aforementioned sliding material. In particular, in cylinder bores requiring strict dimensional accuracy, it is possible to possess favorable sliding characteristics by means of applying the sliding member according to the present invention to cylinder bores, without ever changing the dimensional accuracy of sliding surfaces.

DETAILED DESCRIPTION OF THE PREFERRED EMBODIMENTS

Figure 1:
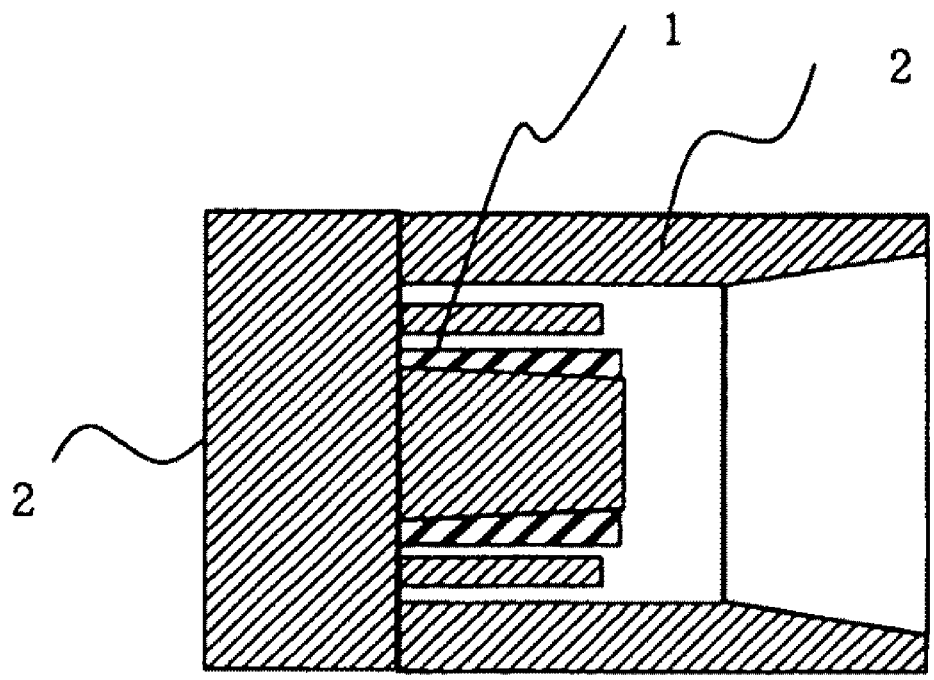
FIG. 1 illustrates a partial explanatory diagram (cross-sectional view) of a manufacturing method for sliding members according to testing examples.
Figure 1:
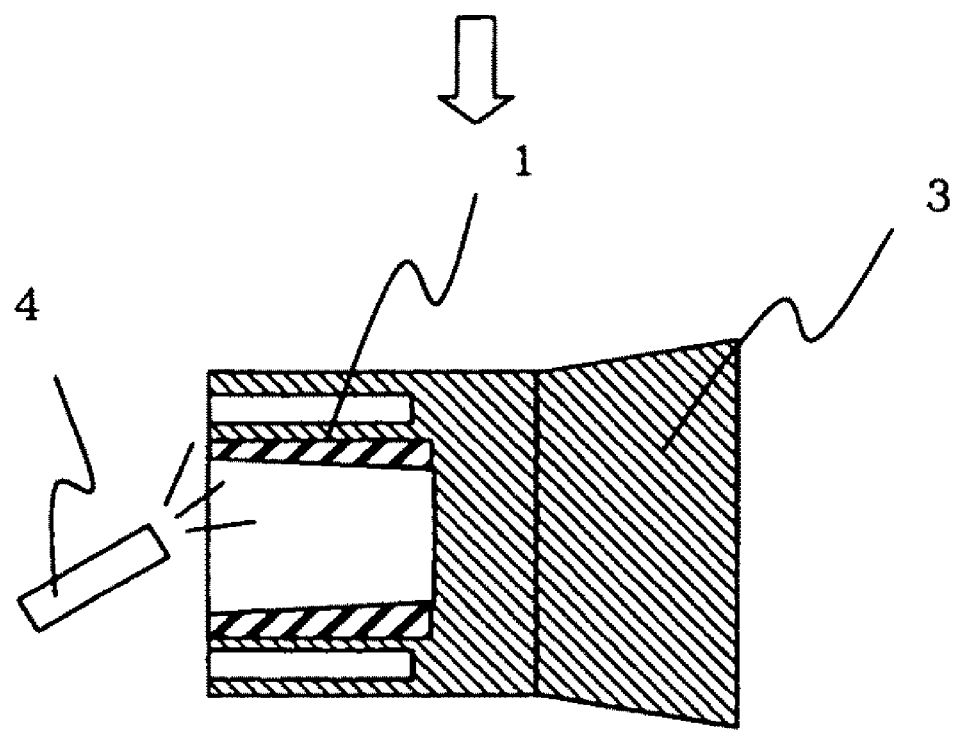

A sliding material according to the present invention comprises a metallic substrate, and an adhered metal.

Moreover, said adhered metal is formed by mechanical adhesion by means of shot blasting metallic particles, which are softer than said metallic substrate and whose friction coefficients are less than that of said metallic substrate, onto a sliding surface of said metallic substrate so as to cover 8% or more of the sliding surface of said substrate.

The metallic substrate in the present invention is not limited in particular as far as it is a substrate comprising a metal that has been used as a sliding material. For example, iron-based metals, aluminum-based metals, and magnesium-based metals can be used.

In particular, as the metallic substrate, those that include iron-based metals are preferable from the viewpoint of strength. For example, iron, iron-based alloys, iron-based porous materials, and composite materials, in which an iron-based porous material is cast-wrapped in aluminum, an aluminum alloy, magnesium or a magnesium alloy, can be used.

Moreover, the metallic substrate can preferably be a composite material in which a first porous metallic substrate is cast-wrapped in a second metallic substrate, which is softer than said first porous metallic substrate. For example, it is possible to use composite materials in which the first porous metallic substrate is an iron-based metal and the second metallic substrate is an aluminum-based metal, and composite materials in which the first porous metallic substrate is an iron-based metal and the second metallic substrate is a magnesium-based metal.

In particular, when the metallic substrate is a composite material in which an iron-based porous material is cast-wrapped in an aluminum alloy, it is preferable because it makes a substrate that is light weight and is excellent in terms of strength as well.

The metallic substrate's configuration is not limited in particular, but it can be those that meet applications as sliding members. For example, the sliding material according to the present invention can be utilized in engine blocks a part of whose surface makes a sliding surface, hydraulic pumps, component parts for compressors, bearings, and the like.

The metallic particles in the present invention are not limited in particular as far as they are those which are softer than a using metallic substrate and whose friction coefficients are smaller than that thereof. For example, as the metallic particles, it is allowable to use aluminum, zinc, tin, gold, copper, magnesium, and nickel.

Moreover, it is allowable the metallic particles' all particles can be made of an identical metal, or that the metallic particles can be those in which a surface of a metal making a core is coated with the other metal. If such is the case, the coated metal can be a metal which is softer than a using metallic substrate, whose friction coefficient is smaller than that of the using metallic substrate, and whose melting point is low.

Moreover, in the case where the metallic substrate is the composite material, it is preferable that the metallic particles can be softer than said first porous metallic substrate and can be harder than said second metallic substrate. For example, in the case where the first porous metallic substrate is an iron-based metal and the second metallic substrate is an aluminum-based metal, as for the metallic particles, zinc, copper, tin, and the like, are preferable.

Moreover, the metallic particles' particle diameters can desirably be from 150 μm or more to 800 μm or less. The fact that they are particles with particle diameters falling within this range makes them likely to be formed on a sliding surface by adhesion by means of being shot blasted onto the sliding surface.

Said metallic particles are formed on a sliding surface by mechanical adhesion by means of being shot blasted. Said metallic particles are alloyed mechanically with said metallic substrate (mechanical alloying), and are thereby adhered mechanically. Since said metallic particles are softer than said metallic substrate, they do not roughen said metallic substrate's surface at all, and do not make the surface roughness (Rz) of the metallic substrate greater very much.

In the case where the metallic substrate is the composite material, said metallic particles are formed on a sliding surface of the first porous metallic substrate, which is harder than themselves, by mechanical adhesion. Moreover, said metallic particles can form dented portions in a sliding surface of the second metallic substrate, which is softer than themselves. The dented portions turn into oil reservoirs in a sliding surface on which a lubricating oil or the like is present, and can thereby further upgrade sliding characteristics.

Moreover, said adhered metal covers at least 8% or more of a sliding surface of said substrate. By means of the fact that it covers at least 8% or more of the sliding surface, characteristics of the adhered metallic particles appear as superficial characteristics, and thereby sliding characteristic of the sliding surface are modified.

Moreover, owing to the fact that the metallic particles, whose friction coefficients are smaller than that of said metallic substrate, are adhered on the sliding surface, it is possible to reduce a friction coefficient of the sliding surface.

In particular, in the case where the metallic substrate is a composite material in which an iron-based porous material is cast-wrapped with an aluminum alloy, the metallic particles can preferably be zinc.

A configuration of the iron-based porous material is not limited in particular. For example, it can be a cylindrical shape, a ring shape, a plate shape, or even a disk shape.

The iron-based porous material's porosity can desirably be from 12% or more to 50% or less. When being a porous material possessing a porosity falling within this range, it turns into a sliding material in which both of the adhesion to aluminum and the strength are favorable.

Moreover, it is allowable that the iron-based porous material can be used even for an entire sliding member, or that it can be used even for a part around a sliding surface.

Moreover, the aluminum alloy can include Cu, Si, Mg, Zn, Fe, Mn, Ni, Sn, or Ti.

For example, as the aluminum alloy, it is possible to use A2000 series according the JIS Standard, and ADC12, AC8A, AC4C, AC2B, or the like.

A manufacturing method for composite material in which an iron-based porous material is cast-wrapped in an aluminum alloy is not limited in particular, because it is an ordinary casting method.

For example, in a mold with a predetermined configuration, mold which makes a predetermined configuration that is in compliance with an objective, the iron-based porous material is disposed at such a position that it is exposed in a sliding surface; and then said aluminum alloy is cast at a predetermined pressure and at a predetermined temperature, thereby cast-wrapping the iron-based porous material and additionally cast-wrapping the porous material with the aluminum alloy down into the pores.

Thereafter, the mold is cooled at a predetermined temperature, and then the sliding material is taken out from it.

Subsequently, a honing process is carried out to the sliding surface of the sliding member that has been taken out from the mold. By means of performing the honing process, the sliding surface turns into a surface in which both iron-based-porous-material surface and aluminum-alloy surface exist.

Next, a shot blasting treatment is carried out to the sliding surface, to which the honing process has been performed, under the following conditions:

Shot Particles' Quality of Material: Zinc;
Shot Particles' Particle Diameters: from 150 μm or more to 800 μm or less;
Air Pressure: from 0.1 MPa or more to 0.3 MPa or less;
Jet Distance: from 50 mm or more to 150 mm or less; and
Projection Time: from 5 seconds or more to 45 seconds or less.

The aforementioned conditions are conditions that make it possible to form zinc on a surface of an iron-based porous material by mechanical adhesion without ever damaging the iron-based porous material.

Accordingly, the sliding member can possess a small friction coefficient and possess favorable sliding characteristics, because zinc is adhered mechanically on the iron-based porous material's surface without making any damages anew in a sliding surface of the iron-based porous material.

Moreover, the aforementioned conditions are also conditions that make it possible to form dented portions in a surface of the aluminum alloy alone without ever damaging the iron-based porous material. In the thus formed dented portions, their depths from the superficial faces can be 0.1 μm-5 μm, and diameters of the dented portions can be 5 μm-100 μm.

In the case where a lubricating agent or the like is utilized, the thus formed dented portions can turn into oil reservoirs for the lubricating agent or the like. Accordingly, the sliding member can possess a small friction coefficient and possess favorable sliding characteristics, because it can retain the lubricating agent or the like in an adequate amount, without making any damages anew in a surface, when utilizing the lubricating agent or the like.

Moreover, since it is possible to carry out the shot blasting treatment partially onto necessary faces, it is possible to carry out the treatment at low cost and simply compared with the electrolytic etching treatments that have been carried out conventionally.

A sliding member according to the present invention is one which uses the aforementioned sliding material. The sliding member in the present invention has a predetermined configuration. The predetermined configuration is not limited in particular, but it can be those that meet applications as sliding members. For example, the sliding member according to the present invention can be utilized in engine blocks a part of whose surface makes a sliding surface, hydraulic pumps, component parts for compressors, bearings, and the like.

EXAMPLES

Hereinafter, testing examples of the sliding member will be explained. In the testing examples, as for the metallic substrate, one in which an iron-based porous material was cast-wrapped in an aluminum alloy was used. In FIG. 1, there is illustrated a partial explanatory diagram (cross-sectional diagram) of a manufacturing method for sliding members according to the testing examples.

A cylindrical iron-based porous sintered body 1, the iron-based porous material, whose porosity was 18% was prepared. As for a quality of material of the iron-based porous sintered body 1, pure iron (KIP440B) was used. As for a configuration of the iron-based porous sintered body 1, one which was formed as a cylindrical configuration with 86-mm diameter, 160-mm height and 5-mm cylinder thickness was used.

As illustrated in FIG. 1, the aforementioned iron-based porous sintered body 1 was disposed in a mold 2 for cylinder block so that the iron-based porous sintered body 1 faced a sliding surface. The mold 2 was a mold for cylinder block, and was formed as a cylindrical configuration as shown in FIG. 1.

An aluminum alloy (ADC12) was poured into this mold 2 from the outer-peripheral side and bottom-surface side of the iron-based porous sintered body 1. The casting conditions on this occasion were adapted into being 680° C. molten-metal temperature, 250° C. mold temperature, 800° C. preheating for the iron-based porous sintered body 1, and 83 MPa molten-metal pressure.

Thus, an aluminum-alloy molten metal was cast to wrap the iron-based porous sintered body 1 therein from the outer-peripheral side and bottom-surface side to the inside. A sliding inner peripheral surface of a cylinder bore 3 being thus obtained was subjected to a honing process with a honing machine.

Using the cylinder bore 3 being manufactured as described above, a shot blasting treatment was carried out under a variety of conditions, and then observations on the resulting surfaces were carried out.

The shot blasting treatment was carried out to an inner peripheral surface of a cylinder, the sliding surface of said cylinder bore 3, using a shot blasting apparatus 4. A shot blasting apparatus, which was manufactured by SHINTO BRAIDER CORPORATION, was used.

In Table 1, the conditions of executed shot blasting are given. Moreover, in FIG. 2, there are shown EPMA mapping images (EPMA: Electron-beam Probe Microanalyzer) on the sliding inner-peripheral surfaces of one of the cylinder bores to which the shot blasting treatment was carried out under the conditions given in Table 1.

TABLE 1

| | | | Shotting Conditions | | | |
|---|---|---|---|---|---|---|
| No. | ID No. | Rz (μm) | Shot Particles' Quality of Material | Air Pressure (MPa) | Jet Distance (mm) | Projection Time (sec.) |
| 1 | 0 | 0.7 | — | — | — | — |
| 2 | 1 | 16.9 | Alumina (AF30) | 0.3 | 100 | 5 |
| 3 | 2 | 9.8 | Iron (SB-3) | 0.3 | 100 | 5 |
| 4 | 2-1 | 9.4 | Iron (SB-3) | 0.1 | 100 | 5 |
| 5 | 2-2 | 8.8 | Iron (SB-3) | 0.1 | 150 | 5 |
| 6 | 3 | 2.2 | Zinc (AD-4) | 0.3 | 100 | 5 |
| 7 | 2-3 | 2.2 | Zinc (AD-4) | 0.1 | 100 | 20 |
| 8 | 2-4 | 4.6 | Zinc (AD-4) | 0.1 | 100 | 30 |

Figure 2:
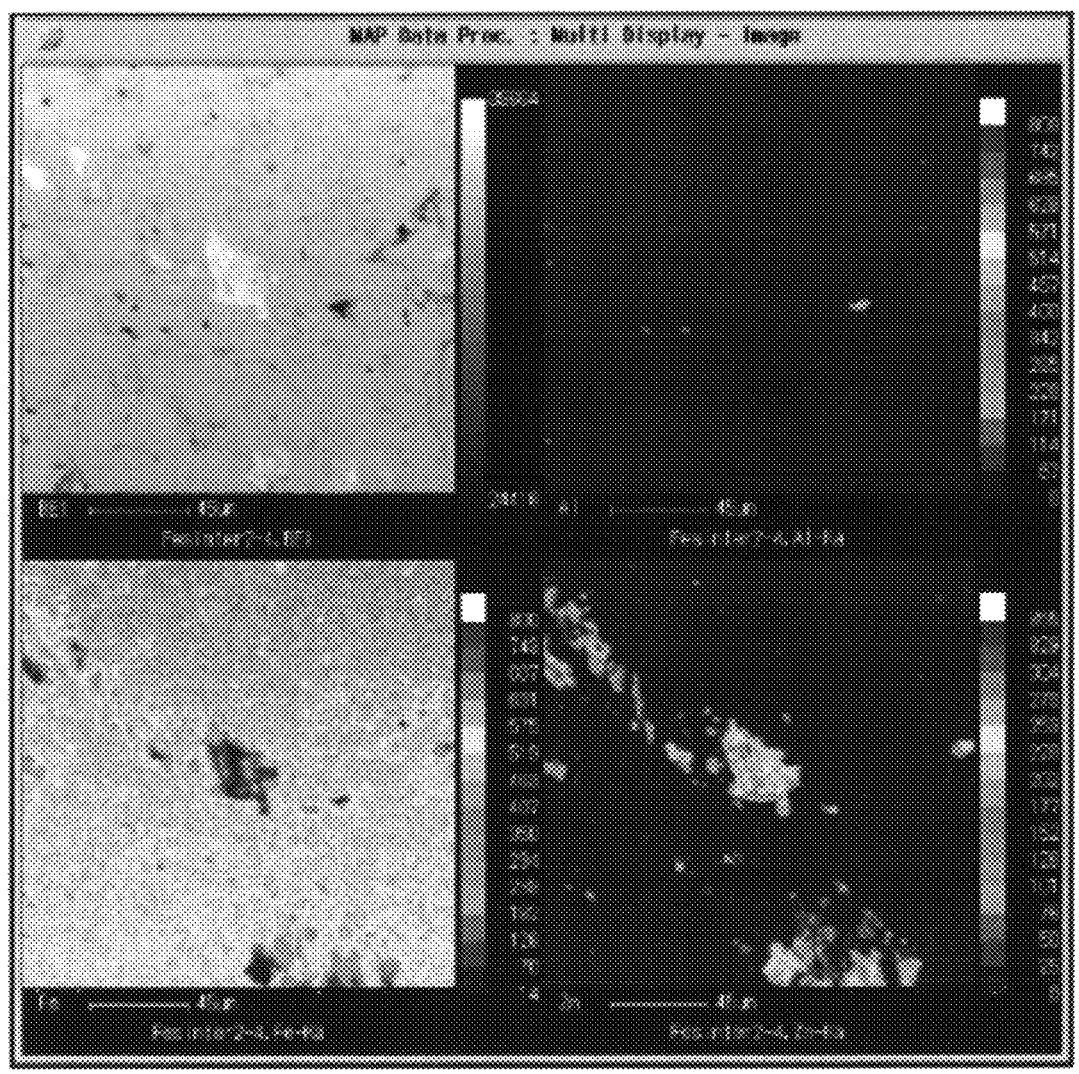
FIG. 2 shows an EPMA mapping image on an inner-peripheral surface of a sliding member according to a testing example of the present invention.

In FIG. 2, there is identified an EPMA mapping on a surface of one of them in which zinc was used as the metallic particles, that is, a surface of No. 8 (Identification No. 2-4) in Table 1. The EPMA was carried out using "EPMA-1600," which was manufactured by SHIMADZU SEISAKUSHO. The upper left diagram in FIG. 1 shows an elemental distribution image on respective component metals, and the upper right, lower right and lower left diagrams show elemental distribution images on aluminum, zinc and iron, respectively. All of the respective four diagrams are those in which the mapping was carried out at the same location. The upper left diagram is one in which the respective metallic compositions were mapped: a metal whose specific gravity was heavy is identified whitely; and a metal whose specific gravity is light is identified blackly. In this case, those being expressed in black represent an aluminum alloy; those being expressed whitely represent zinc; and those being identified in whitish gray represent iron.

Similarly, the upper right diagram shows an elemental distribution image of aluminum, and white parts in the upper right diagram represent aluminum. The lower left diagram shows an elemental distribution image of iron, and parts being specified whitely represent iron. Moreover, the lower right diagram shows an elemental distribution image of zinc, and parts appearing whitely represent aluminum.

From these four diagrams, it is understood that zinc adhered, not to the aluminum parts, but to the iron parts.

The surface roughness of the respective samples to which the shot blasting was carried out under the respective conditions was measured with a contact-type surface-roughness meter, and was identified respectively in the column of "Rz (μm)" in Table 1.

No. 1 (Identification No. 0 (hereinafter, the respective "Nos." will be explained using the "Identification Nos.")) in Table 1 was one which was subjected to a honing process using a honing machine, but in which no shot blasting treatment was carried out.

Identification No. 1 in Table 1 was one in which the shot particles were adapted into alumina abrasive particles #80 (manufactured by SHINTO BRAIDER Co., Ltd., Part No. AF80 whose median particle diameter was about 190 μm (Particle-diameter Range: 150-212 μm)), and in which the shot blasting treatment was carried out under the conditions being set forth in Table 1. As can be seen in Table 1, the surface roughness (Rz) became so large as 16.9 μm.

Identification Nos. 2, 2-1 and 2-2 in Table 1 were those in which the shot particles were adapted into steel (manufactured by SHINTO BRAIDER Co., Ltd., Part No. SB-3, and median particle diameter being about 300 μm (Particle-diameter Range: 180-500 μm)), and in which the shot blasting treatment was carried out under the conditions being set forth in Table 1.

Since the steel shot particles were used, the aluminum alloy as well as the iron-based porous sintered material were scraped off wholly in their surfaces by means of the shot blasting, and thereby the surface roughness (Rz) became such a large value as 8.8 μm or more as can be seen in Table 1.

Identification Nos. 3, 2-3 and 2-4 in Table 1 were those in which the shot particles were adapted into zinc (manufactured by SHINTO BRAIDER Co., Ltd., Part No. AD-4, and median particle diameter being about 400 μm (Particle-diameter Range: 297-710 μm)), and in which the shot blasting treatment was carried out under the conditions being set forth in Table 1.

As set forth in Table 1, the surface roughness (Rz) became so small as less than 5 μm. Since the zinc shot particles were harder than the aluminum alloy and were softer than the iron-based porous sintered material, they could cut the aluminum-alloy parts selectively without ever damaging iron, it is believed that they did not make the surface roughness (Rz) greater very much.

Figure 5:
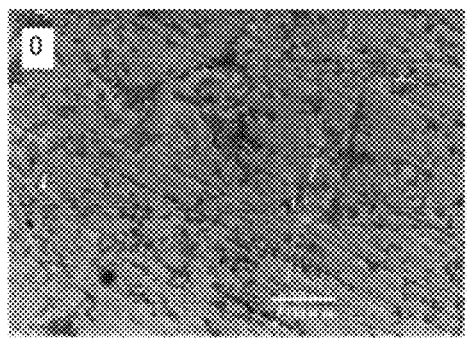
FIG. 5 shows SEM-observation results on inner-peripheral surfaces of sliding members according to testing examples of the present invention.
Figure 5:
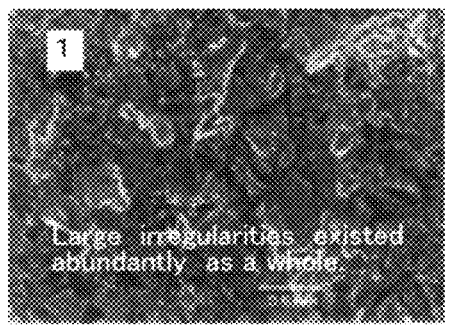
Figure 5:
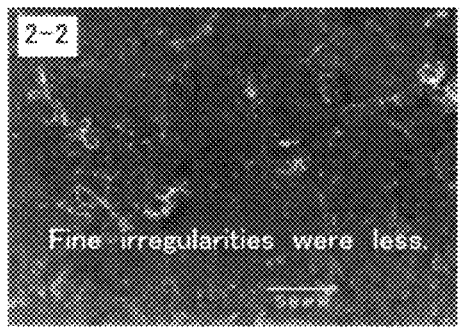
Figure 5:
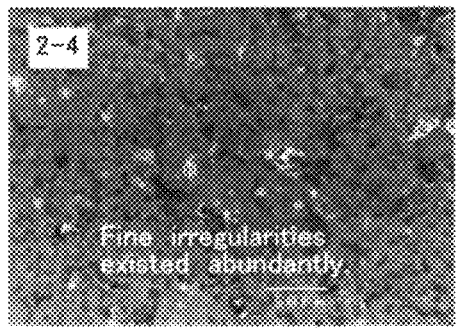

Moreover, in FIG. 5, there are shown results of the SEM observation on the sliding inner-peripheral surfaces of some of the cylinder bores to which the shot blasting treatment was carried out under the conditions designated in Table 1. In addition, the "Identification Nos." being set forth in Table 1 correspond to the numbers on the SEM photographs in FIG. 5.

No. 1 (Identification No. 0 (hereinafter, the respective "Nos." will be explained using the "Identification Nos.")) in Table 1 and FIG. 5 was one which was subjected to a mirror-surfacing process with a honing machine, but in which no shot blasting treatment was carried out. As can be seen in the SEM photograph on Identification No. 0 in FIG. 5, in the sample's surface, although the honing-process cross-hatched streak-like marks were seen, no dented portions, which should have been seen blackly on SEM photographs, were observed.

When observing the sliding inner-peripheral surface of the cylinder bore which underwent the mirror-surfacing process, a surface was observed, surface in which the aluminum alloy got into the interstices of the iron-based porous sintered body. Therefore, in the surface, both iron-based-porous-sintered-body surface and aluminum-alloy surface existed.

Identification No. 1 in FIG. 5 shows a superficial SEM photograph on one in which the shot particles were adapted into alumina (manufactured by SHINTO BRAIDER Co., Ltd., Part No. AF80 whose particle diameter was about 200 μm), and in which the shot blasting treatment was carried out under the conditions being set forth in Table 1.

Since alumina is harder than iron and aluminum alloy, as can be seen in Identification No. 1 in FIG. 5, the aluminum alloy as well as the iron-based porous sintered material were scraped off wholly in their surfaces by the alumina particles, and it was observed that large irregularities were made wholly in the surface. Moreover, the surface roughness (Rz) became so large as 16.9 μm as can be seen in Table 1.

Identification No. 2-2 in FIG. 5 shows a superficial SEM photograph on one in which the shot particles were adapted into iron (manufactured by SHINTO BRAIDER Co., Ltd., Part No. SB-3, and the particle diameter being about 300 μm), and in which the shot blasting treatment was carried out under the shotting conditions being set forth in Table 1.

Since the iron shot particles were used, the aluminum alloy as well as the iron-based porous sintered material were scraped off wholly in their surfaces by means of the shot blasting treatment, and thereby the surface roughness (Rz) became 8.8 μm or more as can be seen in Table 1.

Although the surface roughness (Rz) became a large value, as can be seen in Identification No. 2-2 in FIG. 5, there were less fine dented portions in the surface.

Identification No. 2-4 in FIG. 5 shows a superficial SEM photograph on one in which the shot particles were adapted into zinc (manufactured by SHINTO BRAIDER Co., Ltd., Part No. AD-4, and the particle diameter being about 400 μm), and in which the shot blasting treatment was carried out under the shotting conditions being set forth in Table 1.

The surface roughness (Rz) was less than 5 μm as set forth in Table 1, and it was observed that fine dented portions existed abundantly in the surface as can be seen in Identification No. 2-4 in FIG. 5. Although the dented portions were seen to be formed as various configurations, the dented portions were observed to have diameters of 2 μm-20 μm approximately when considering them cylindrical configurations substantially.

Since the zinc shot particles were harder than the aluminum alloy and were softer than the iron-based porous sintered material, they could cut the aluminum-alloy parts selectively without ever damaging iron, and thereby it is believed that they could form the fine dented portions abundantly without ever making the surface roughness (Rz) greater very much.

A sliding test was carried out using the respective cylinder-bore samples that were made under the aforementioned conditions.

In the sliding test, a mating member to be slid on them was adapted into a piston ring (nitrided SUS) and a reciprocal sliding testing machine was used; and the sliding test was carried out under the following conditions, thereby measuring friction coefficients before seizure and times (min.) until seizure:

Stroke•Speed: 40 mm•500 cpm;
Load: 3 kgf;
Surface-pressure Maximum Hertz Stress: 20 kgf/mm$^2$; and
Testing Temperature: 70° C.

As a lubricating oil, E/G oil for CC-class diesel was coated in an amount of 0.13 mg/cm² to use.

Figure 3:
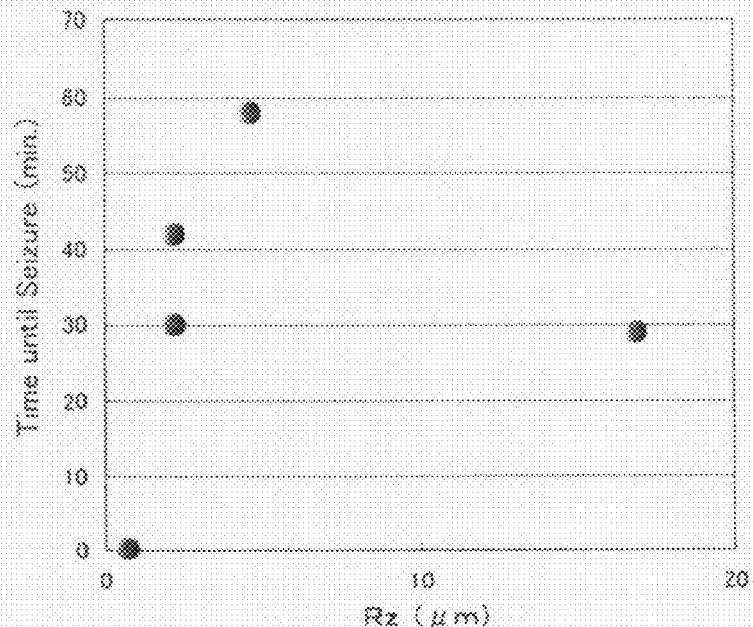
FIG. 3 illustrates a graph that compares surface roughnesses (Rz) with times until seizure (min.).
Figure 4:
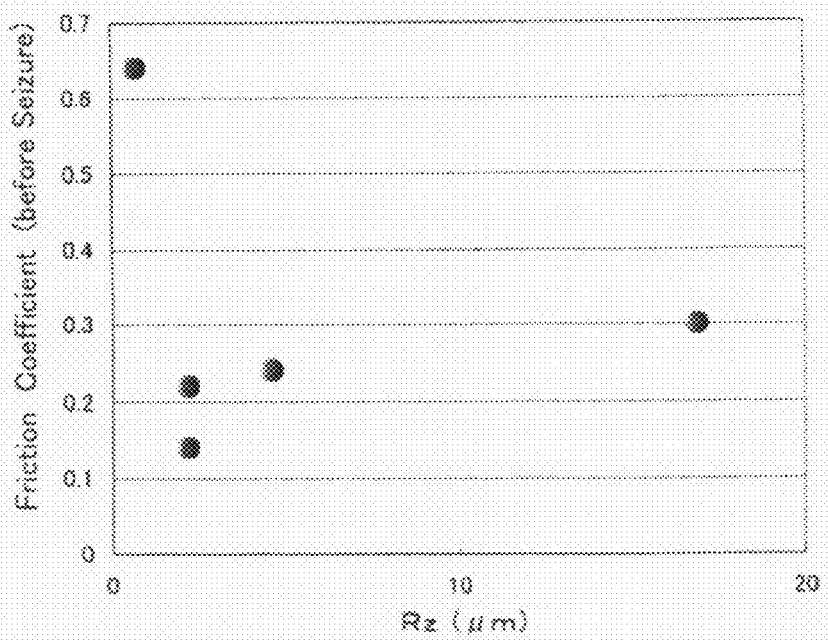
FIG. 4 illustrates a graph that compares surface roughnesses (Rz) with friction coefficients before seizure.

In Table 2, there are designated the friction coefficients before seizure and times until seizure for the respective samples. In FIG. 3, there is illustrated a graph for comparing the surface roughnesses (Rz) with the times (min.) until seizure; and, in FIG. 4, there is illustrated a graph for comparing the surface roughnesses (Rz) with friction coefficients before seizure.

TABLE 2

| No. | ID No. | Rz (μm) | Shotting Conditions | | | | Friction | |
|---|---|---|---|---|---|---|---|---|
| | | | Shot Particles' Quality of Material | Air Pressure (MPa) | Jet Distance (mm) | Projection Time (sec.) | Time until Seizure | Coefficient before Seizure |
| 1 | 0 | 0.7 | — | — | — | — | 0.15 | 0.64 |
| 2 | 1 | 16.9 | Alumina (AF30) | 0.3 | 100 | 5 | 29 | 0.3 |
| 6 | 3 | 2.2 | Zinc (AD-4) | 0.3 | 100 | 5 | 30 | 0.14 |
| 7 | 2-3 | 2.2 | Zinc (AD-4) | 0.1 | 100 | 20 | 42 | 0.22 |
| 8 | 2-4 | 4.6 | Zinc (AD-4) | 0.1 | 100 | 30 | 58 | 0.24 |

Of the samples, Identification Nos. 0, 1, 3, 2-3 and 2-4 were used to carry out the sliding test.

In the sample according to Identification No. 0 to which no shot blasting treatment was carried out, the surface roughness (Rz) was 0.7 μm; and it had been seizured in such a short time period of 0.15 minutes in the sliding test. Moreover, the friction coefficient before seizure was so high as 0.64.

Moreover, in the sample according to Identification No. 1 to which the shot blasting treatment was carried out using alumina, the surface roughness (Rz) was so high as 16.9 μm; and it was one in which large irregularities were seen in the SEM observation. In the sample according to Identification No. 1, the time until seizure was 29 minutes in the sliding test, and the friction coefficient before seizure was 0.3.

On the contrary, in the samples according to Identification Nos. 3, 2-3 and 2-4 to which the shot blasting treatment was carried out using zinc, the surface roughness (Rz) was 2-5 μm; and they were those in which a large number of dented portions were seen in the SEM observation. In the samples according to Identification Nos. 3, 2-3 and 2-4, although the Rz was low, the time until seizure improved considerably compared with those of the other samples. Moreover, the friction coefficient before seizure became low compared with the other samples.

In the samples in which zinc was used for the shot particles, it is believed that, owing to the fact that zinc is formed on the iron-based sintered body's surface by adhesion without ever damaging the iron-based sintered body's surface to make the surface roughness greater, the friction coefficient could be reduced. Moreover, since the dented portions further existed abundantly in the surface, the dented portions turn into oil reservoirs, and thereby it was possible to retain the lubricating oil. Accordingly, the overall friction coefficients of the samples could be reduced in the sliding test, and consequently it is believed that the times until seizure could be prolonged.

Moreover, by means of the fact that the adhered area of zinc, which was calculated from the EPMA mappings, was 8% or more, the advantageous effects were available.

Thus, it is possible for the aforementioned sliding members to turn into sliding members that improve sliding characteristics, owing to the fact that it was possible to adhere the adhered metal with low friction coefficient in an amount of 8% or more on a metallic surface with large friction coefficient in the sliding surface, and owing to the fact that they possessed a low friction coefficient without ever making the surface roughness greater.

Moreover, it is thus possible for the aforementioned sliding members to further retain a lubricating agent or the like in an adequate amount by means of the fact that the aforementioned dented portions form oil reservoirs in the sliding surface, and to further turn into sliding members which can utilize the lubricating effects of oil while possessing a low friction coefficient but without making damages for retaining oil anew in the surface.

The invention claimed is:

1. A sliding material, comprising:
   a metallic substrate comprising a composite material having a first porous metallic material and a second metallic substrate in which the first porous metallic material is cast-wrapped, wherein the second metallic substrate is softer than the first porous metallic substrate, and the first porous metallic substrate is exposed in a sliding surface of the metallic substrate; and
   an adhered metal being formed by mechanical adhesion by means of shot blasting metallic particles onto the sliding surface of said metallic substrate thereby to cover 8% or more of the sliding surface of said metallic substrate, whereby the metallic particles are softer than the first porous metallic substrate, but harder than the second metallic substrate and exhibit smaller friction coefficients than-that of said metallic substrate, wherein:
   by said shot blasting, dented portions are formed on an outer surface of the second metallic substrate, the depth of each dented portion from the outer surface of the second metallic substrate is 0.1 μm-5 μm, and the diameter of which is 5 μm-100 μm.

2. The sliding material set forth in claim 1, wherein:
   said first porous metallic substrate comprises an iron-based porous material;
   said second metallic substrate comprises an aluminum alloy;
   said metallic particles comprise zinc; and
   said adhered metal is formed on a surface of said iron-based porous material in said sliding surface by mechanical adhesion.

3. The sliding material set forth in claim 1, wherein said second metallic substrate has a surface which comprises dented portions being formed by means of shot blasting said metallic particles.

4. The sliding material set forth in claim 1, wherein said shot blasting is carried out under the following conditions:
   Particle Diameters of the Metallic Particles: from 150 gm or more to 800 .mu.m or less;
   Air Pressure: from 0.1 MPa or more to 0.3 MPa or less;
   Jet Distance: from 50 mm or more to 150 mm or less; and Projection Time: from 5 seconds or more to 45 seconds or less.

5. A sliding member comprising the sliding material set forth in claim 1, and having a predetermined configuration.

6. The sliding member set forth in claim 5, wherein said sliding material makes a cylinder bore.

7. A process for manufacturing a sliding material having a metallic substrate comprising a composite material including a first porous metallic substrate and a second metallic substrate in which the first porous metallic substrate is cast-wrapped, wherein the first porous metallic substrate is exposed in a sliding surface of the metallic substrate, the process comprising:

shot blasting metallic particles, which are softer than the first porous metallic substrate, but are harder than the second metallic substrate and which exhibit smaller friction coefficient than that of said metallic substrate, onto the sliding surface of the metallic substrate, whereby an adhered metal is formed by mechanical adhesion thereby to cover 8% or more of the sliding surface of said metallic substrate and dented portions are formed on an outer surface of the second metallic substrate, the depth of each dented portion from the outer surface of the second metallic substrate is 0.1 μm-5 μm, and the diameter of which is 5 μm-100 μm.

* * * * *